(12) United States Patent
Carpenter et al.

(10) Patent No.: US 11,842,344 B2
(45) Date of Patent: *Dec. 12, 2023

(54) MIRRORED TOKEN VAULT

(71) Applicant: Visa International Service Association, San Francisco, CA (US)

(72) Inventors: Andrew Carpenter, Belmont, CA (US); Paul Tait, San Mateo, CA (US); Dan Kurland, Foster City, CA (US); Barbara Patterson, South San Francisco, CA (US)

(73) Assignee: Visa International Service Association, San Francisco, CA (US)

(*) Notice: Subject to any disclaimer, the term of this patent is extended or adjusted under 35 U.S.C. 154(b) by 28 days.

This patent is subject to a terminal disclaimer.

(21) Appl. No.: 17/721,743

(22) Filed: Apr. 15, 2022

(65) Prior Publication Data

US 2022/0398571 A1    Dec. 15, 2022

Related U.S. Application Data

(63) Continuation of application No. 16/882,212, filed on May 22, 2020, now Pat. No. 11,334,885, which is a
(Continued)

(51) Int. Cl.
*G06Q 40/00* (2023.01)
*G06Q 20/38* (2012.01)
(Continued)

(52) U.S. Cl.
CPC .......... *G06Q 20/385* (2013.01); *G06Q 20/32* (2013.01); *G06Q 20/36* (2013.01);
(Continued)

(58) Field of Classification Search
None
See application file for complete search history.

(56) References Cited

U.S. PATENT DOCUMENTS

| 8,453,127 B2 | 5/2013 | Balko et al. |
| 2012/0173431 A1 | 7/2012 | Ritchie et al. |

(Continued)

FOREIGN PATENT DOCUMENTS

| CN | 102844776 A | 12/2012 |
| CN | 105580038 | 5/2016 |

(Continued)

OTHER PUBLICATIONS

Application No. CN201780049318.0, Office Action, dated Nov. 24, 2022, 18 pages.

(Continued)

*Primary Examiner* — Olabode Akintola
(74) *Attorney, Agent, or Firm* — Kilpatrick Townsend & Stockton LLP

(57) ABSTRACT

Embodiments are directed to a first token vault managed by a token service provider and a second token vault managed by a second entity. The first token vault is continuously synchronized with the second token vault in real-time. That is, the data in the second token vault is updated simultaneously with or immediately after the data in the first token vault is updated. In some embodiments, the first token vault may be a master token vault and the second token vault may be a mirror token vault. The mirror token vault may store the same information as the master token vault. Alternatively, the mirror token vault may store a subset of the information stored at the master token vault. In other embodiments, the information stored at the first token vault and the information stored at the second token vault may be mutually exclusive.

18 Claims, 8 Drawing Sheets

Related U.S. Application Data continuation of application No. 16/311,583, filed as application No. PCT/US2017/046558 on Aug. 11, 2017, now Pat. No. 10,699,270.

(60) Provisional application No. 62/374,711, filed on Aug. 12, 2016.

(51) Int. Cl.
*G06Q 20/36* (2012.01)
*G06Q 20/32* (2012.01)
*G06Q 20/40* (2012.01)
*H04L 9/32* (2006.01)

(52) U.S. Cl.
CPC ..... *G06Q 20/3672* (2013.01); *G06Q 20/3674* (2013.01); *G06Q 20/38* (2013.01); *G06Q 20/40* (2013.01); *G06Q 20/401* (2013.01); *H04L 9/3213* (2013.01)

(56) References Cited

U.S. PATENT DOCUMENTS

| | | | |
|---|---|---|---|
| 2012/0259782 | A1 | 10/2012 | Hammad |
| 2013/0198080 | A1 | 8/2013 | Anderson et al. |
| 2013/0212007 | A1* | 8/2013 | Mattsson ............. G06Q 20/405 705/39 |
| 2015/0013006 | A1 | 1/2015 | Shulman et al. |
| 2015/0032627 | A1 | 1/2015 | Dill et al. |
| 2015/0046338 | A1* | 2/2015 | Laxminarayanan ........................ G06Q 20/38215 705/67 |
| 2015/0312038 | A1* | 10/2015 | Palanisamy ........... H04L 9/3213 713/155 |
| 2016/0028550 | A1 | 1/2016 | Gaddam et al. |
| 2016/0232527 | A1 | 8/2016 | Patterson |
| 2017/0061433 | A1* | 3/2017 | Kulshreshtha ....... G06Q 20/405 |
| 2018/0026973 | A1* | 1/2018 | Le Saint ................ G06Q 20/18 713/168 |

FOREIGN PATENT DOCUMENTS

| | | | | |
|---|---|---|---|---|
| KR | 101623523 | * | 5/2016 | ............ G06Q 20/34 |
| KR | 101623636 | * | 5/2016 | ............ G06Q 20/34 |
| WO | 2018031914 | | 2/2018 | |

OTHER PUBLICATIONS

"Failover", Wikipedia—Online Encyclopaedia, Available Online at: https://en.wikipedia.org/w/index.php?title=Failover&oldid=731886077, Jul. 28, 2016, 2 pages.

"Fault Tolerance", Wikipedia—Online Encyclopaedia, Available Online at: https://en.wikipedia.org/w/index.php?title=Fault_tolerance&oldid=730746696, Jul. 20, 2016, 8 pages.

EP17840354.9 , "Extended European Search report", May 24, 2019, 8 pages.

Application No. EP17840354.9 , Office Action, dated Feb. 26, 2021, 8 pages.

Application No. EP17840354.9 , Office Action, dated May 31, 2022, 8 pages.

Application No. PCT/US2017/046558 , International Search Report and Written Opinion, dated Nov. 24, 2017, 11 pages.

Application No. SG11201811424P , Notice of Decision to Grant, dated Jul. 2, 2020, 4 pages.

Application No. CN201780049318.0 , Office Action, dated Jun. 21, 2023, 8 pages.

* cited by examiner

MIRRORED TOKEN VAULT

CROSS-REFERENCE TO RELATED APPLICATIONS

This application is a continuation application U.S. application Ser. No. 16/882,212, filed May 22, 2020, titled "Mirrored Token Vault", which is a continuation application of U.S. application Ser. No. 16/311,583, filed Dec. 19, 2018, now U.S. Pat. No. 10,699,270, issued on Jun. 30, 2020, titled "Mirrored Token Vault", which is a 371 patent application of International Application No. PCT/US2017/046558, filed on Aug. 11, 2017, which claims the benefit of U.S. Patent Application No. 62/374,711 titled "Third Party Token Service Provider", filed on Aug. 12, 2016, which is herein incorporated by reference in its entirety for all purposes.

BACKGROUND

Tokens may be used in lieu of account identifiers in transaction processing systems. Entities is a transaction processing system may generate, process and approve/decline an authorization request message for a transaction using the token. The transaction may be for acquiring a resource, a good or a service provided by a resource provider.

In conventional systems, the token generating entity (e.g. the token service provider) stores the generated token and data associated with the token at a storage (e.g. token vault). Accordingly, in conventional systems, the token generating entity is in charge of all token-related activity without being privy to all information about the user and/or the account associated with the token.

Conventional processes for storing and processing tokens can be inefficient. The token service provider is in charge of generating and processing the tokens. However, the token service provider is not generally in possession of all information about the user and/or the account associated with the token. For example, the token may represent an account identifier associated with a first account issued to the user by a first issuer. The transactions using the first account may be processed by a first transaction processing entity. The user may have at least a second account issued by a second issuer, and at least a third account issued by the first issuer. The transactions using the second account may be processed by the first transaction processing entity, and the transactions using the third account may be processed by a second transaction processing entity.

When the token service provider is the first transaction processing entity, the token service provider will have information about the first account and the second account. However, the token service provider will not have information about the third account. When the token service provider is the first issuer, the token service provider will have information about the first account and the third account. However, the token service provider will not have information about the second account. Accordingly, during processing of the token the token service provider may not in possession of all information to make an informed determination about whether the transaction (e.g. authorization request) should be approved/decline.

There is a need to provide for systems and methods that can allow for storage of token data at multiple locations managed by different entities to provide redundancy and allow for division of token processing responsibilities among the different entities to provide for increased fraud prevention by having each party to perform a different data analysis using the data accessible to respective entities.

In addition, in the conventional systems the token and token data are stored at a single location (e.g. token vault). Therefore, when the token vault is hacked, the sensitive information is compromised.

Embodiments of the invention address this and other problems, individually and collectively.

BRIEF SUMMARY

Embodiments provide systems and methods that store token and token data at multiple locations managed by different entities. Therefore, embodiments provide redundancy when one of the token storage locations is compromised or otherwise becomes unavailable. Embodiments further allow for division of token processing responsibilities among the different entities to provide for increased fraud prevention by having each party to perform a different data analysis using the data accessible to respective entities.

Embodiments of the present invention relate to a method performed by a server computer for storing a token and data associated with the token at a first token vault and a second token vault. The method may comprise receiving an authorization request message including the token. The authorization request message is associated with a transaction. The method may also include retrieving an account identifier represented by the token and data associated with the token from the first token vault. The account identifier is associated with a user account. The first taken vault storing a first set of data associated with the token is synchronized with the second token vault storing a second set of data associated with the token. The method may further include transmitting, to an authorizing entity; a modified authorization request message including the token and the data associated with the token. The data associated with the token includes at least the account identifier. The method also includes receiving, from the authorizing entity, an authorization response message authorizing or declining the transaction. The authorizing entity retrieves additional data associated with the token from the second token vault and approves or declines the transaction based on at least the additional data.

Embodiments of the invention are further directed to a server computer comprising a processor and a memory element. The memory element can comprise code, executable by the processor, for implementing the method described above.

Embodiments of the invention are further directed to a method performed by a server computer for storing a token and data associated with the token at a first token vault and a second token vault. The method comprises generating a token representing an account identifier associated with a user account and storing the token and a mapping between the token and the account identifier at the first token vault. The server computer manages the first token vault. The method further comprises synchronizing the first token vault with the second token vault. The first token vault stores a first set of data associated with the token and the second token vault stores a second set of data associated with the token. The method also includes receiving an authorization request message including the token and data associated with the token. The data associated with the token includes at least the account identifier and the authorization request message is associated with a transaction. The method incudes generating an authorization response message authorizing or declining the transaction and transmitting the authorization response message to a transaction processing computer.

These and other embodiments of the invention are described in further detail below.

DETAILED DESCRIPTION

Figure 1A:
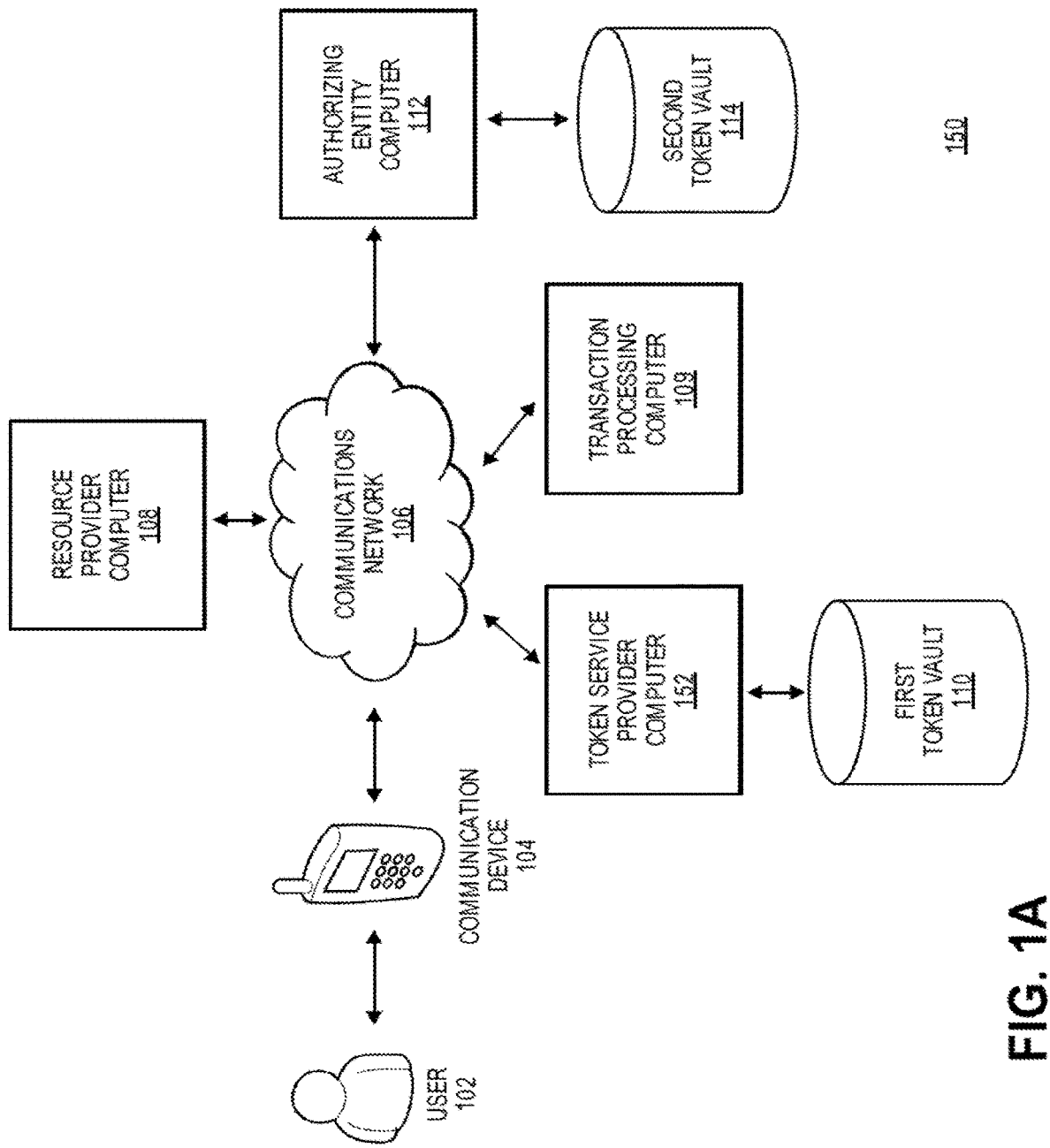
FIG. 1A shows a block diagram of a tokenization and transaction processing environment according to various embodiments.

Tokens may be used to represent account identifiers associated with user accounts. For example, a token may represent a primary account number associated with a payment account of a user. Alternatively, a token may represent an employment identification number assigned to an employee by an employer. The tokens may be associated with token data, such as a token expiration date, token assurance level, token type, token status indicator, a device identifier associated with the token (e.g. a token requestor identifier), an account identifier expiration date, a token assurance level, domain restrictions associated with the token (and/or the underlying user account), etc. The tokens and the associated token data may be stored at one or more token vaults (e.g. token databases).

Embodiments are directed to a first token vault managed by a token service provider (e.g. token generating entity) and a second token vault managed by a second entity (e.g. a transaction processing network, a resource provider, an authorizing entity, etc.). The first token vault is continuously synchronized with the second token vault in real-time. That is, the data in the second token vault is updated simultaneously with or immediately after the data in the first token vault is updated. In some embodiments, the first token vault may be a master token vault and the second token vault may be a mirror token vault. The mirror token vault may store the same information as the master token vault. Alternatively, the mirror token vault may store a subset of the information stored at the master token vault. In other embodiments, the information stored at the first token vault and the information stored at the second token vault may be mutually exclusive.

In some embodiments, the token service provider may be the transaction processing network and the second entity managing the second token vault may be the issuer of the user account represented by the token. The transaction processing network may store a first set of data associated with the token at the first token vault while the issuer may store a second set of data associated with the token at the second token vault. For example, the first set of data may include one or more of the account identifier associated with the token, a token expiration date, a token status indicating whether the token is active or inactive, an expiration date of the account identifier, an identifier of the entity that requested the generation of the token (e.g. a requester identifier). The second set of data may include one or more of domain restrictions associated with the token, override authorizations associated with the token, and the like Prior to discussing specific embodiments of the invention, some terms may be described in detail.

A "communication device" may include any suitable device that can allow for communication with an external entity. A communication device may be a mobile device if the mobile device has the ability to communicate data to and from an external entity.

A "mobile device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), W-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of mobile devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a mobile device can function as a payment device (e.g., a mobile device can store and be able to transmit payment credentials for a transaction).

A "credential" may be any suitable information that serves as reliable evidence of worth, ownership, identity, or authority. A credential may be a string of numbers, letters, or any other suitable characters, as well as any object or document that can serve as confirmation, Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a user), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" or "wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile device or access device. Additionally, a digital wallet provider may also provide one or more of the following functions: storing multiple payment cards and other payment products on behalf of a user, storing other information including billing address, shipping addresses, and transaction history, initiating a transaction by one or more methods, such as providing a user name and password, NFC or a physical token, and may facilitate pass-through or two-step transactions.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

An "account identifier" may include an original account identifier associated with a payment account. For example, an account identifier may be a primary account number (PAN) issued by an issuer for a card account (e.g., credit card, debit card, etc.). For instance, in some embodiments, an account identifier may include a sixteen digit numerical value such as "4147 0900 0000 1234." The first six digits of the account identifier (e.g., "414709"), may represent an issuer identifier (BIN) that may identify an issuer associated with the account identifier.

"Tokenization" can include a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information which may be replaced with a substitute value (i.e., a token).

A "token provider" or "token service system" can include a system that services payment tokens. In some embodiments, a token service system can facilitate requesting, determining (e.g., generating) and/or issuing tokens, as well as maintaining an established mapping of tokens to account identifiers (e.g. primary account numbers (PANS)) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "token vault" may include a repository that maintains established token mappings. It may be present in a token service computer. According to various embodiments, the token vault may also maintain other attributes of the token requestor that may be determined at the time of registration. The attributes may be used by the token provider to apply domain restrictions or other controls during transaction processing. In some embodiments, the token vault may be a part of the token provider. Alternatively, the token vault may be a remote repository accessible to the token provider. Token vaults, due to the sensitive nature of the data mappings that are stored and managed in them, may be protected by strong underlying physical and logical security.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token data" can include data associated with the token. For example; the token data may include the account identifier (e.g. primary account number (PAN)), the mapping between the token and the account identifier, the account identifier expiration date (e.g. PAN expiration date), the token assurance level, the token requestor identifier, the token status identifier, the token type, the device identifier that provided or generated the token, etc.

"Token exchange" or "de-tokenization" can include a process of restoring the data that was substituted during tokenization. For example, a token exchange may include replacing a payment token with a corresponding primary account number (PAN) that was associated with the payment token during tokenization of the PAN. Thus, the de-tokenization may refer to the process of redeeming a token for the associated PAN value based on a token-to-PAN mapping stored, for example, in a token vault. The ability to retrieve a PAN in exchange for the associated token may be restricted to specifically authorized entities, individuals, applications, or systems. Further, de-tokenization or token exchange may be applied to any other information. In some embodiments, token exchange may be achieved via a transactional message, such as an ISO message, an application programming interface (API), or another type of web interface (e.g., web request). Token exchange may also be achieved via a credential request message, whereby a requesting entity, which may be a token holder, makes a request to receive a PAN associated with a token.

A "token request message" may be an electronic message for requesting a token. A token request message may include information usable for identifying a payment account or digital wallet, and/or information for generating a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key).

A "token response message" may be a message that responds to a token request. A token response message may include an indication that a token request was approved or declined. A token response message may also include a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key).

A "user" may include an individual. In some embodiments, a user may be associated with one or more personal accounts and/or mobile devices. The user may also be referred to as a cardholder, account holder, or consumer.

A "resource provider" may be an entity that can provide a resource such as goods, services, information, and/or access. Examples of resource providers include merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "authorizing entity" is an entity which can authorize or approve interactions. An authorizing entity may typically refer to a business entity (e.g., a bank) that maintains an account for a user, and is capable of authorizing interactions such as payment transactions, for example the purchase of goods or services. An issuer is an example of an "authorizing entity" which may operate an authorizing entity computer. Other examples of authorizing entities may include governmental agencies, transit agencies, etc.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

Embodiments are directed to storing tokens and data associated with tokens (e.g. an account identifier represented by the token, a mapping between the token and the account identifier, a token expiration date, a token status indicating whether the token is active or inactive, an expiration date of the account identifier, an identifier of the entity that requested the generation of the token (e.g. a requestor identifier), domain restrictions associated with the token, override authorizations associated with the token, etc.) at multiple locations: at least a first token vault managed by a token service provider (e.g. token generating entity) and a second token vault managed by a second entity (e.g. a transaction processing network, a resource provider, an authorizing entity, etc.). The first token vault is continuously synchronized with the second token vault in real-time. That is, the data in the second token vault is updated simultaneously with or immediately after the data in the first token vault is updated.

In some embodiments, the first token vault may be a master token vault and the second token vault may be a mirror token vault. The mirror token vault may store the same information as the master token vault. Alternatively, the mirror token vault may store a subset of the information stored at the master token vault. In other embodiments, the information stored at the first token vault and the information stored at the second token vault may be mutually exclusive.

Embodiments enable third party entities (an entity other than the transaction processing entity) to act as a token service provider. FIG. 1A shows a block diagram of a tokenization and transaction processing environment 150 according to various embodiments. A user 102 may communicate with a token service provider computer 152 using a user communication device 104 via communications network 106. For example, the user 102 may be an account holder of an account issued by the authorizing entity computer 112. The user 102 (or the authorizing entity computer 112) may request an account identifier identifying the account to be represented using a token. The token service provider computer 152 may generate a token representing the account identifier, and store the token, the corresponding account identifier and a mapping between the token and the account identifier at a first token vault 110. The token service provider computer 152 may also store additional token data at the first token vault 110, For example, the additional token data may include one or more of a token expiration date, a token status indicating whether the token is active or inactive, an expiration date of the account identifier, an identifier of the entity that requested the generation of the token (e.g. a requester identifier), domain restrictions associated with the token, override authorizations associated with the token, etc.) at multiple locations: at least a first token vault managed by a token service provider (e.g. token generating entity) and a second token vault managed by a second entity (e.g. a transaction processing network, a resource provider, an authorizing entity, etc.).

The token service provider computer 152 may also send the token and at least a subset of the data associated with the token to the authorizing entity computer 112 via the communications network 106. The authorizing entity computer 112 may store the received token and token data at a second token vault 114. The first token vault 110 and the second token vault 114 may be continuously synchronized in real-time, for example by the token generating entity. That is, when the content of the first token vault 110 is updated, the content of the second token vault 114 gets automatically updated. In some embodiments, data stored at the first token vault 110 may be the same as the data stored at the second token vault 114. That is, the second token vault 114 may be a backup vault mirroring the contents of the first token vault 110 (e.g. the first token vault 110 and the second token vault 14 are non-mutually exclusive). Alternatively, data stored at the second token vault 114 may be a subset of data stored at the first token vault 110. In some embodiments, data stored at the first token vault 110 and data stored at the second token vault 114 may be mutually exclusive.

After the token is generated, the token service provider computer 152 may return the token to the user 102 via the communications network 106. The user 102 may present the token to a resource provider computer 108 during a transaction conducted with the resource provider computer 108. For example, the user 102 may request a servicer or a resource provided by the resource provider computer 108, The resource provider computer 108 may generate an authorization request message including the token presented by the user 102 and forward the authorization request message to a transaction processing computer 109. The resource provider computer 108 may interact with the token service provider computer 152 to retrieve the account identifier represented by the token. The token service provider computer 152 may receive the token from the transaction processing computer 109, retrieve the account identifier corresponding to the token and token data from the first token vault 110, and return the token and the token data to the transaction processing computer 109. The transaction processing computer 109 may modify the authorization request message to incorporate the token and the token data received from the token service provider computer 152 in the authorization request message. The transaction processing computer 109 may transmit the modified authorization request message to the authorizing entity computer 112 via the communications network.

In some embodiments, the authorizing entity computer 112 may retrieve additional token data associated with the token from the second token vault 114. The additional token data may only be stored at the second token vault 114 (e.g. may not be stored at the first token vault 110). The authorizing entity computer 112 may determine to authorize or decline the authorization request based on at least the token data retrieved from the first token vault 110 and, if applicable, the additional token data retrieved from the second token vault 114. The authorizing entity computer 112 may generate an authorization response message authorizing or declining the transaction and return the authorization response message to the resource provider computer 108 via the transaction processing computer 109 through the communication network 106. The resource provider computer 108 may provide the services or resources to the user 102 based on the authorization response message.

The communications network 106 can take the form of any suitable communication network; which may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the entities; providers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Figure 1B:
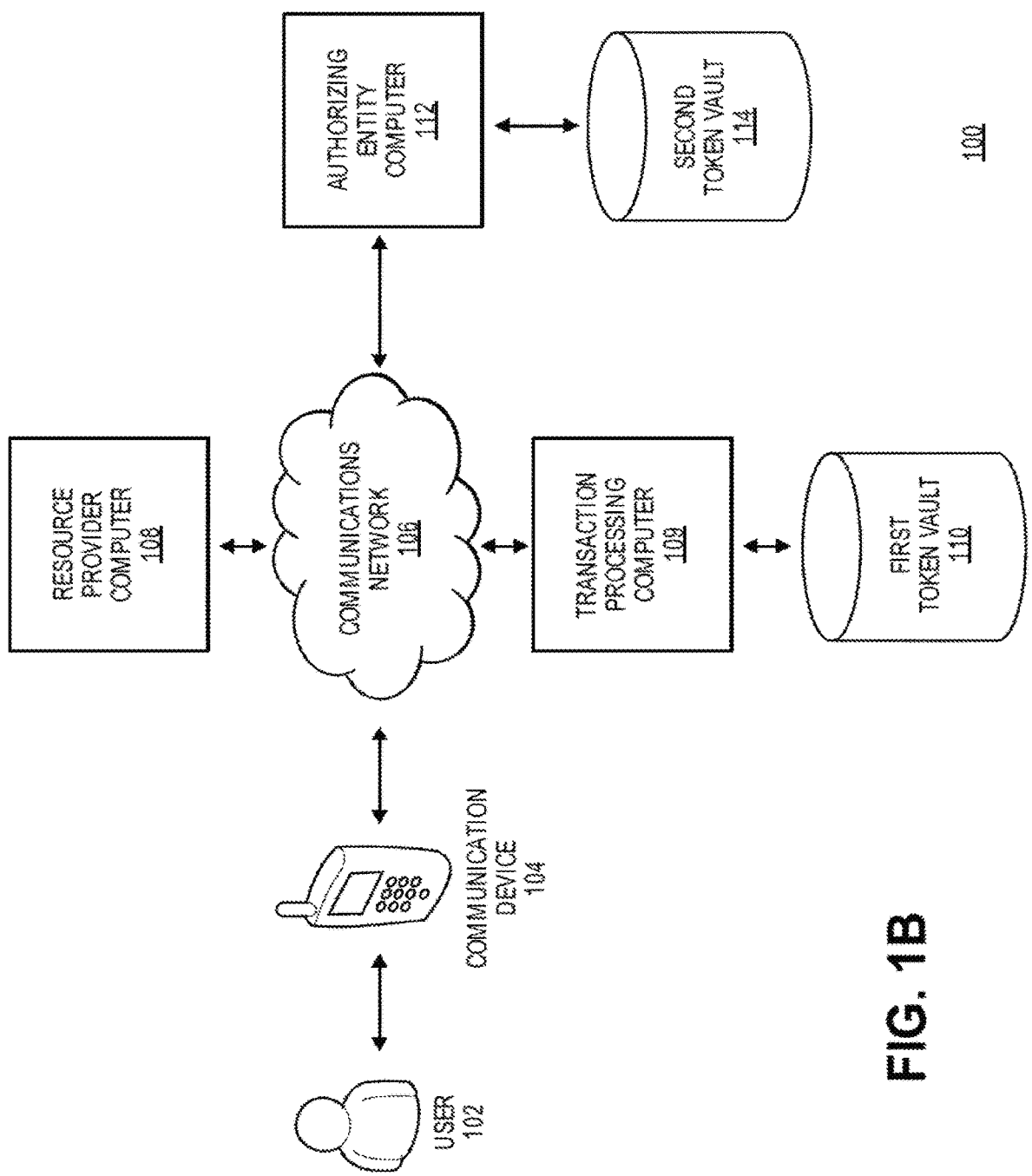
FIG. 1B shows a block diagram of a tokenization and transaction processing environment including a third party token service provider according to various embodiments.
Figure 2:
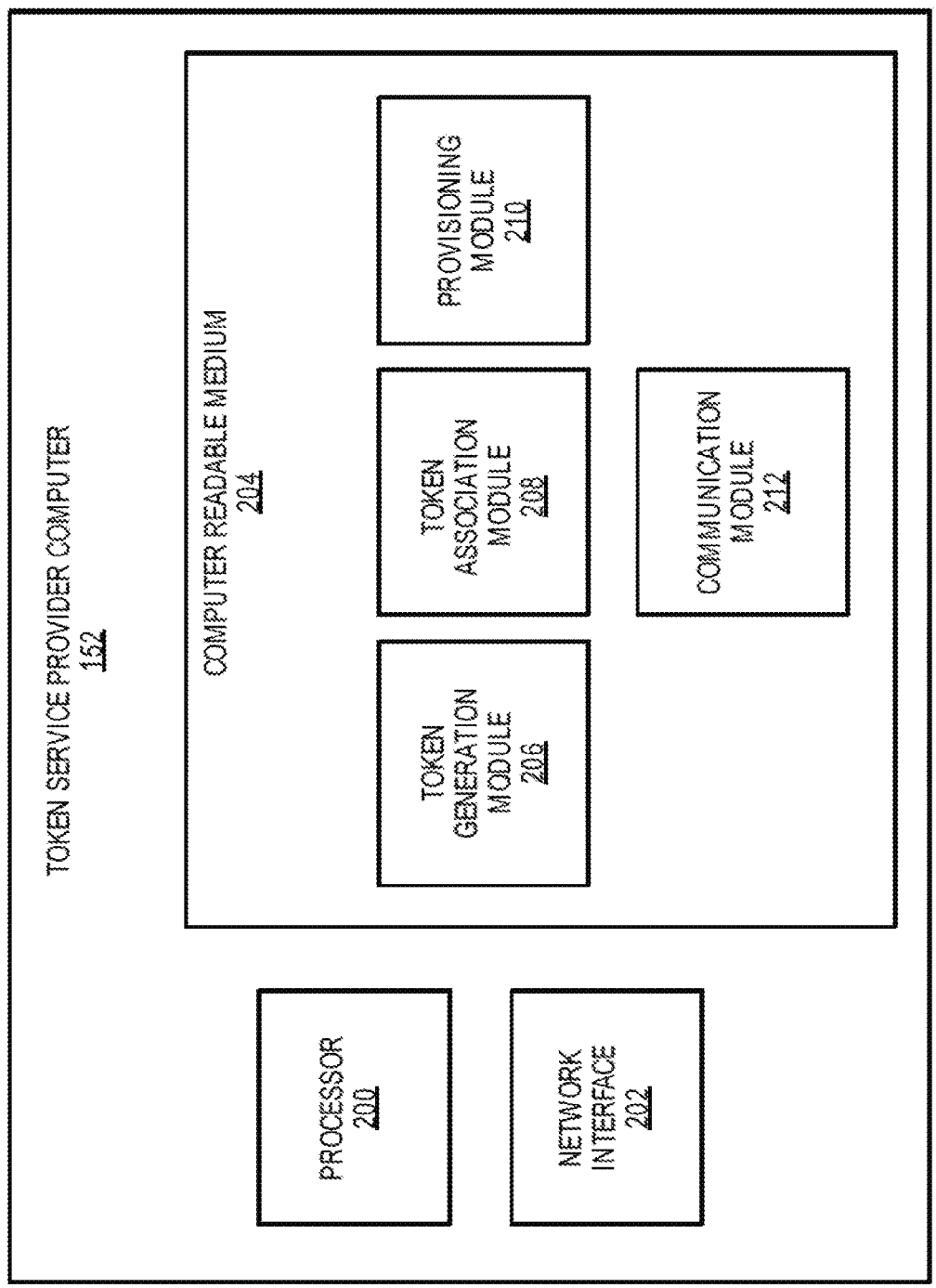
FIG. 2 shows a block diagram showing basic components that may reside in an exemplary token service provider computer.

FIG. 2 shows a block diagram showing basic components that may reside in an exemplary token service provider computer 152. The token service provider computer 152 may form part of a transaction processing computer 109 in some embodiments of the invention, as illustrated in FIG. 1B. The token service provider computer 152 comprises a processor 200, a network interface 202, and a computer readable medium 204.

The computer readable medium 204 may comprise a token generation module 206, a token association module 208, a provisioning module 210, and a communication module 212.

The token generation module 206 may comprise code that causes the processor 200 to generate a token. In some embodiments, the token may include 16 digits and may resemble a PAN.

The token association module 208 may comprise code that causes the processor 200 to associate a token with other data (e.g., user data including e-mail addresses, telephone numbers, primary account numbers, etc., token data including token expiration date, token requester identifier, etc.). For example, the token association module 208 may contain logic that causes the processor 200 to link a generated a token with received user input data, and to store the information in the first token vault 110.

The provisioning module 210 may comprise code that causes the processor 200 to provision tokens. For example, the provisioning module 210 may contain logic that causes the processor 200 to generate provisioning scripts, and to provide the provisioning scripts, a token, and any other suitable information to an electronic notification apparatus.

The communication module 212 may comprise code that causes the processor 200 to generate messages, reformat messages, and/or otherwise communicate with other entities. For example, the communication module 212 may contain logic that causes the processor 200 to identify a token in a received message and provide return a real credential associated with the token in response.

According to some embodiments, the token service provider computer 152 may form part of an authorizing entity computer 112. The authorizing entity computer 112 may generate a token representing an account identifier associated with a user account and store the token along with a mapping between the token and the account identifier at the first token vault. The authorizing entity may manage the first token vault. The authorizing entity computer 112 may continuously synchronize the first token vault with a second token vault. The second token vault may be managed by a different entity. The first token vault may store a first set of data associated with the token and the second token vault may store a second set of data associated with the token. The second data set stored at the second token vault may be a subset of the first data set stored at the first vault. The authorizing entity computer 112 may receive an authorization request message associated with a transaction. The authorization request message may include the token and data associated with the token (e.g. the account identifier). The authorizing entity computer 112 may generate an authorization response message authorizing or declining the transaction and transmit the authorization response message to a transaction processing computer.

In FIGS. 3-7, the token service provider 304 is illustrated as a separate entity. However, as explained above, the tokens service provider 304 may be a part of or managed by the transaction processing computer 109 or the authorizing entity computer 112.

Figure 3:
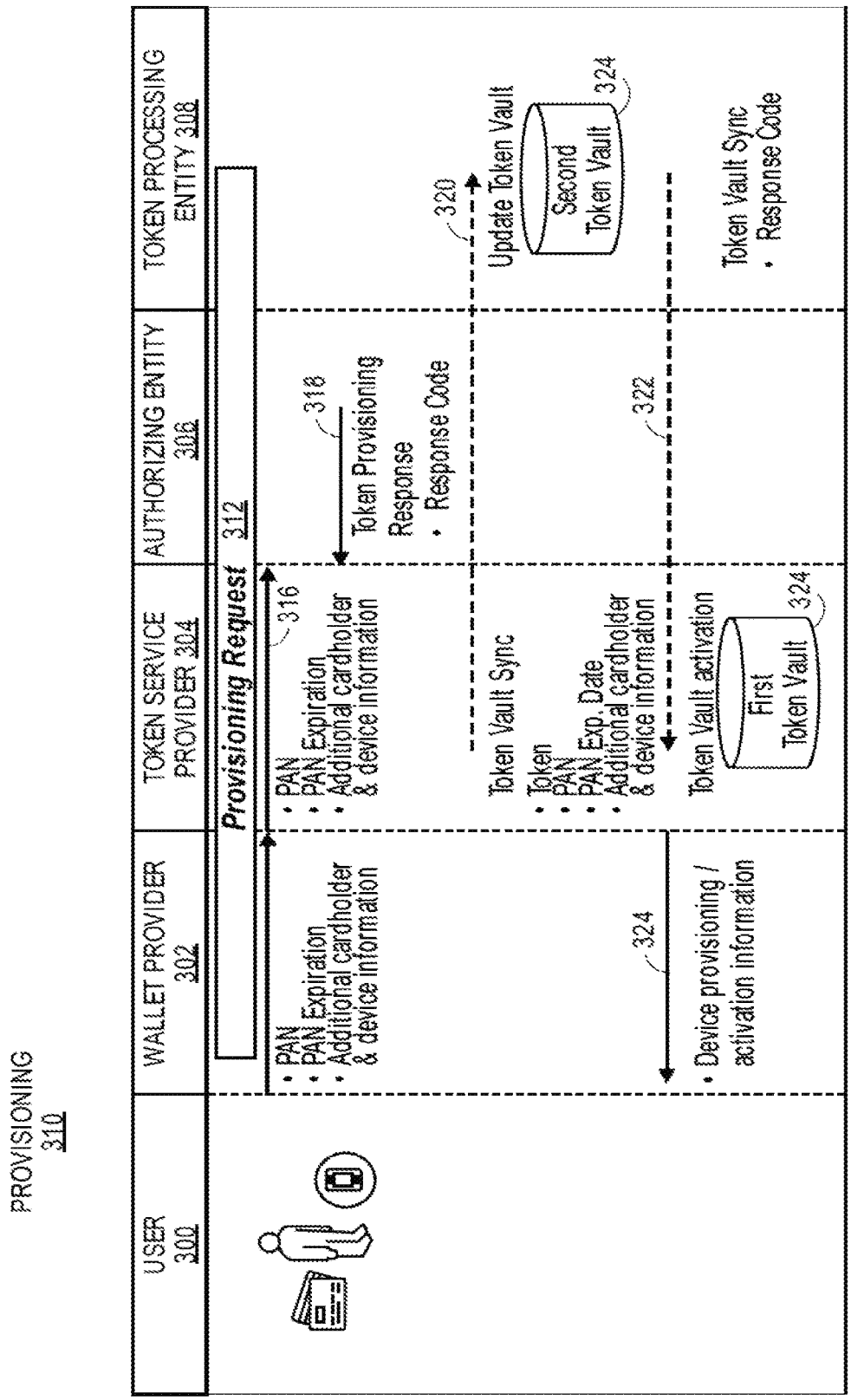
FIG. 3 shows a block diagram for token provisioning in a tokenization environment according to various embodiments.

FIG. 3 illustrates a token provisioning data flow 312 among the entities of a tokenization and transaction processing environment. As illustrated in FIG. 3, the user 300 (e.g. account holder) may send a message 316 to a token service provider 304 via a wallet provider 302. The message may include an account identifier (e.g. a primary account number (PAN)) along with additional information (e.g. account identifier expiration, user information, user device information, etc.). The token service provider 304 may confirm with an authorizing entity 306 (e.g. issuer) that the account identifier is eligible or qualifies for being provisioned on a user device. Upon receiving a token provisioning response message 318 from the authorizing entity 306, the token service provider 304 may then generate a token and store the token, as well as a mapping between the token and the account identifier, at a first token vault 324. The token service provider 304 may manage the first token vault 324.

In some embodiments, the token service provider 304 may provide the token and associated token data (e.g. mapping between the generated token and the corresponding account identifier, token expiration date, token requestor identifier, etc.) to the transaction processing entity 308 so that transaction processing entity 308 can store the received data at a second token vault 326 managed and/or accessible by the transaction processing entity 308. In some embodiments, the token service provider 304 may provide, to the transaction processing entity 308, a subset of the token data stored at the first token vault 324. For example, the token service provider 304 may not provide a copy of the token but rather the token-account identifier mapping to the payment processing network. If the transaction processing entity 308 does not manage token provisioning (e.g. when the provisioning is handled by the token service provider 304), the transaction processing entity 308 may not need obtain the token.

Embodiments may support synchronizing the first token vault 324 with the second token vault 326 in real-time. That is, the contents of the second token vault 326 may be updated substantially simultaneously with the contents of the first token vault 324. For example, the token service provider 304 may send a message 320 to the transaction processing entity 308 including the token data stored at the first token vault 324. Wien the transaction processing entity 308 stores the received token data at the second token vault 326, the transaction processing entity 308 may send a token vault synchronization response message 322 to the token service provider 304 to confirm that the contents of the second token vault 326 have been updated. According to various embodiments, the token vault synchronization messages 320 and 322 may be based on industry standards for messages, such as ISO 0302. In the exemplary embodiment illustrated in FIG. 3, the contents of the first token vault 324 may be the same as the contents of the second token vault 326.

Figure 4:
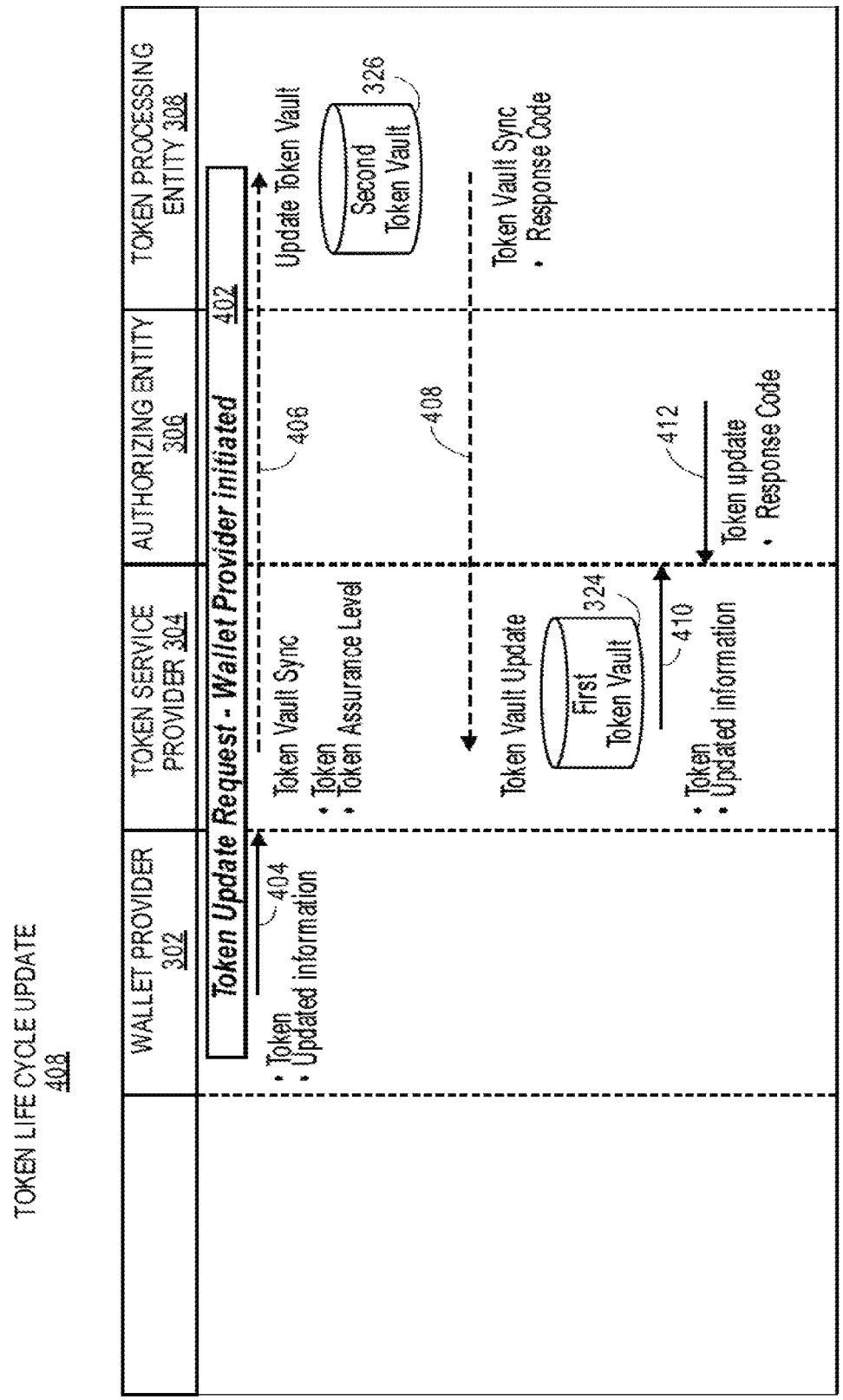
FIG. 4 shows a block diagram for token lifecycle update initiated by a wallet provider in a tokenization environment according to various embodiments.

When the token or the underlying account/account identifier has changed or the token has expired, the token may need to be updated. FIG. 4 illustrates an exemplary token life cycle update 400 process including a token update request 402 initiated by the wallet provider 302. The wallet provider 302 may send a token update request message 404 to the token service provider 304. The token update request message 404 may include the token and the updated information. The token service provider 304 may update the first token vault 324 with the information received from the wallet provider 302. The token service provider 304 may then synchronize the first token vault 324 with the second token vault 326 by sending a token update message 406 to the transaction processing entity 308 managing the second token vault 326. When the transaction processing entity 308 updates the contents of the second token vault 326, the transaction processing entity 308 may send a token vault synchronization confirmation message 408 to the token service provider 304. In some embodiments, the token service provider 304 may inform the authorizing entity 306 of the updated token information. For example, the token service provider 304 may send a token update message 410 to the authorizing entity 306 including the token and the updated information. The authorizing entity 306 may send a token update conformation message 412 to the to the token service provider 304 confirming receipt of the updated token and/or token data.

Figure 5:
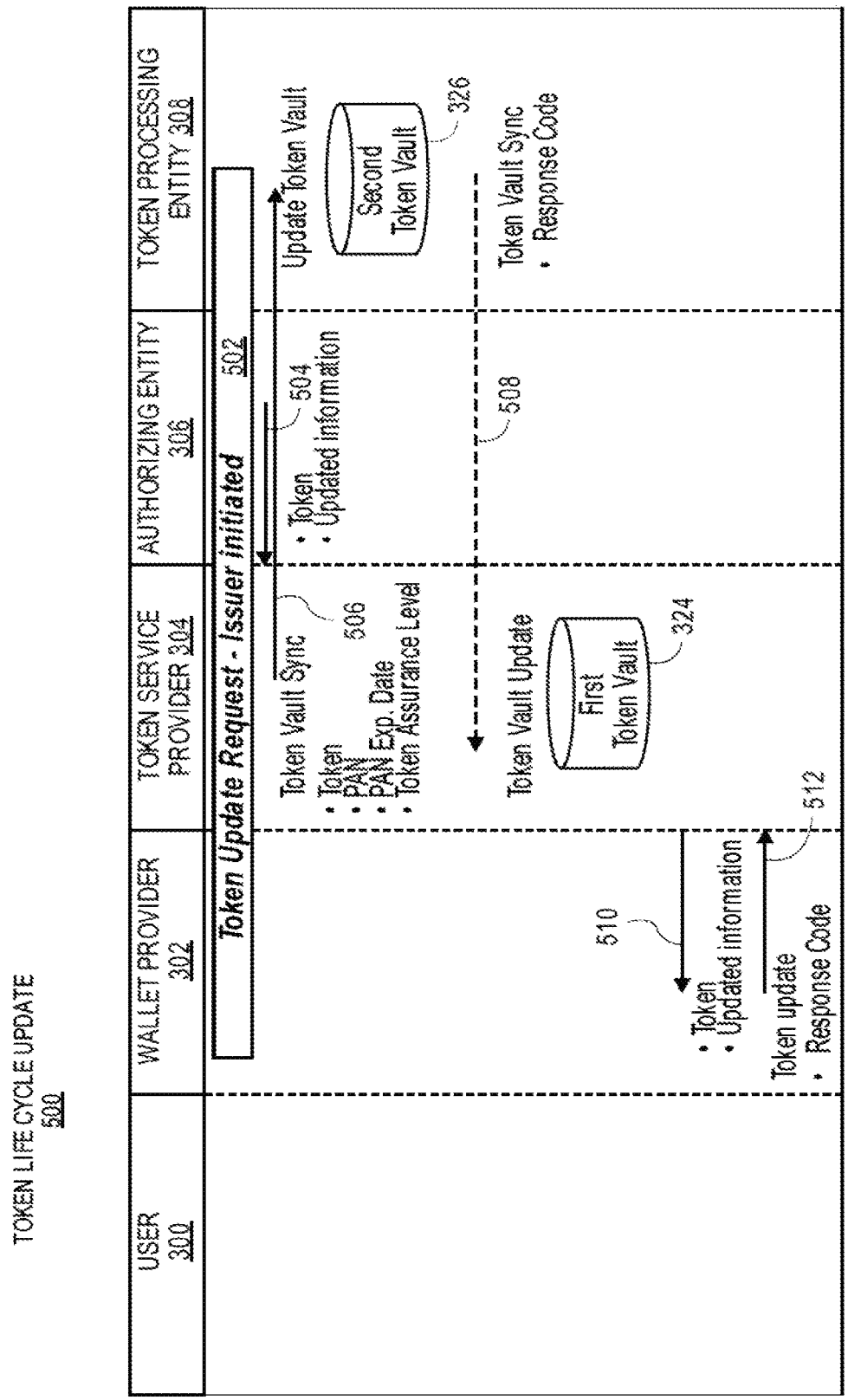
FIG. 5 shows a block diagram for token lifecycle update initiated by an issuer in a tokenization environment according to various embodiments.

In some embodiments, an entity other than the wallet provider may request the token or the data associated with the token to be updated. FIG. 5 illustrates an exemplary token life cycle update 500 process including a token update request 502 initiated by the authorizing entity 306. The authorizing entity 306 may send a token update request message 504 to the token service provider 304. The token update request message 504 may include the token and the updated information. The token service provider 304 may update the first token vault 324 with the information received from the authorizing entity 306. The token service provider 304 may then synchronize the first token vault 324 with the second token vault 326 by sending a token update message 506 to the transaction processing entity 308 managing the second token vault 326. When the transaction processing entity 308 updates the contents of the second token vault 326, the transaction processing entity 308 may send a token vault synchronization confirmation message 508 to the token service provider 304. In some embodiments, the token service provider 304 may inform the wallet provider 302 of the updated token information. For example, the transaction processing entity 308 may send a token update message 510 to the wallet provider 302 including the token and the updated information. The wallet provide 302 may send a token update conformation message 512 to the to the token service provider 304 confirming receipt of the updated token and/or token data.

As explained above, when the token service provider 304 generates the token, the token service provider 304 may return the token to the user 302. The user may present the token to a resource provider 350 during a transaction with the resource provider 350 for the user 302 to access a service or a resource provided by the resource provider 350. Upon receiving the token, the resource provider 350 may starts an authorization process 600 as illustrated in FIG. 6.

Figure 6:
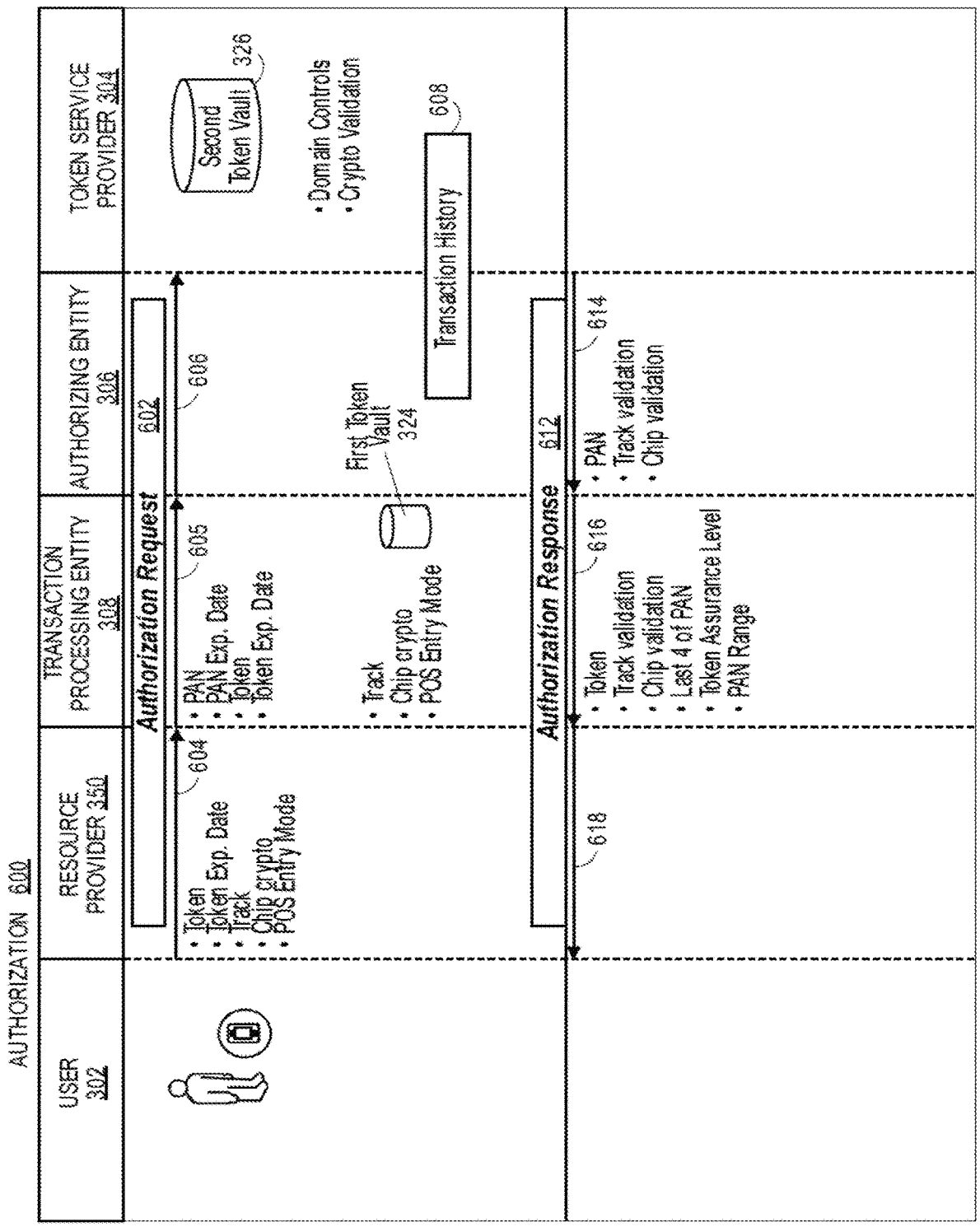
FIG. 6 shows a block diagram for authorization processing in a tokenization environment according to various embodiments.

FIG. 6 shows the authorization process 600 having two main components: the authorization request 602 and the authorization response 612 associated with a transaction, During the authorization request 602, the resource provider 350 generates an authorization request message 604 and sends the authorization request message 604 to the transaction processing entity 308. The authorization request message 604 may include the token, the token expiration date received from the user 302, as well as any additional data associated with the token (e.g. token presentment mode), the user device (e.g. device identifier, whether the user device has a cryptoprocessor and the data received from the user device is encrypted), the resource provider's device (e.g. device identifier) and/or the transaction.

In the embodiment illustrated in FIG. 6, the transaction processing entity 308 may manage the first token vault 324 that stores at least the token, the account identifier associated with the token and a mapping between the token and the account identifier. Accordingly, the transaction processing entity 308 may detokenize the token and generate a modified authorization request message 605 including at least the account identifier (e.g. PAN) and the token. The detokenization may include retrieving the account identifier represented by the token and data associated with the token from the first token vault. The modified authorization request message 605 may also include the account identifier expiration date and the token expiration date. The transaction processing entity 308 may transmit the modified authorization request message 605 to the authorizing entity 306.

The authorizing entity 306 may retrieve additional data from the second token vault 326 via the token service provider 304. The second token vault 326 may store additional data associated with the token. For example, the second token vault 326 may store domain controls, encryption validation keys, etc. In some embodiments, the token service provider 304 may send transaction history 608 associated with the account identifier and/or the token to the authorizing entity 306. The transaction history 608 associated with the token may be stored at the second token vault 326. The authorizing entity 306 may determine to authorize or decline the transaction based on the data retrieved from the first token vault 324 and the second token vault 326.

As part of the authorization response 612 of the authorization process 600, the authorizing entity 306 may generate an authorization response message 614 and send the authorization response message 614 to the transaction processing entity 308. The authorization response message 614 may include at least the primary account identifier and an indication of whether the transaction is approved or declined. The authorization response message 614 may also include the chip validation indicator. The transaction processing entity 308 may generate a modified authorization response message 616 to replace the account identifier with the corresponding token and send the modified authorization response message 616 to the resource provider 350. The resource provider 350 may notify the user 302 about whether the transaction is approved or declined at step 618.

In some embodiments, the transaction processing entity 308 may "stand-in" for the authorizing entity 306 and approve or decline the authorization request in lieu of the authorizing entity 306.

Figure 7:
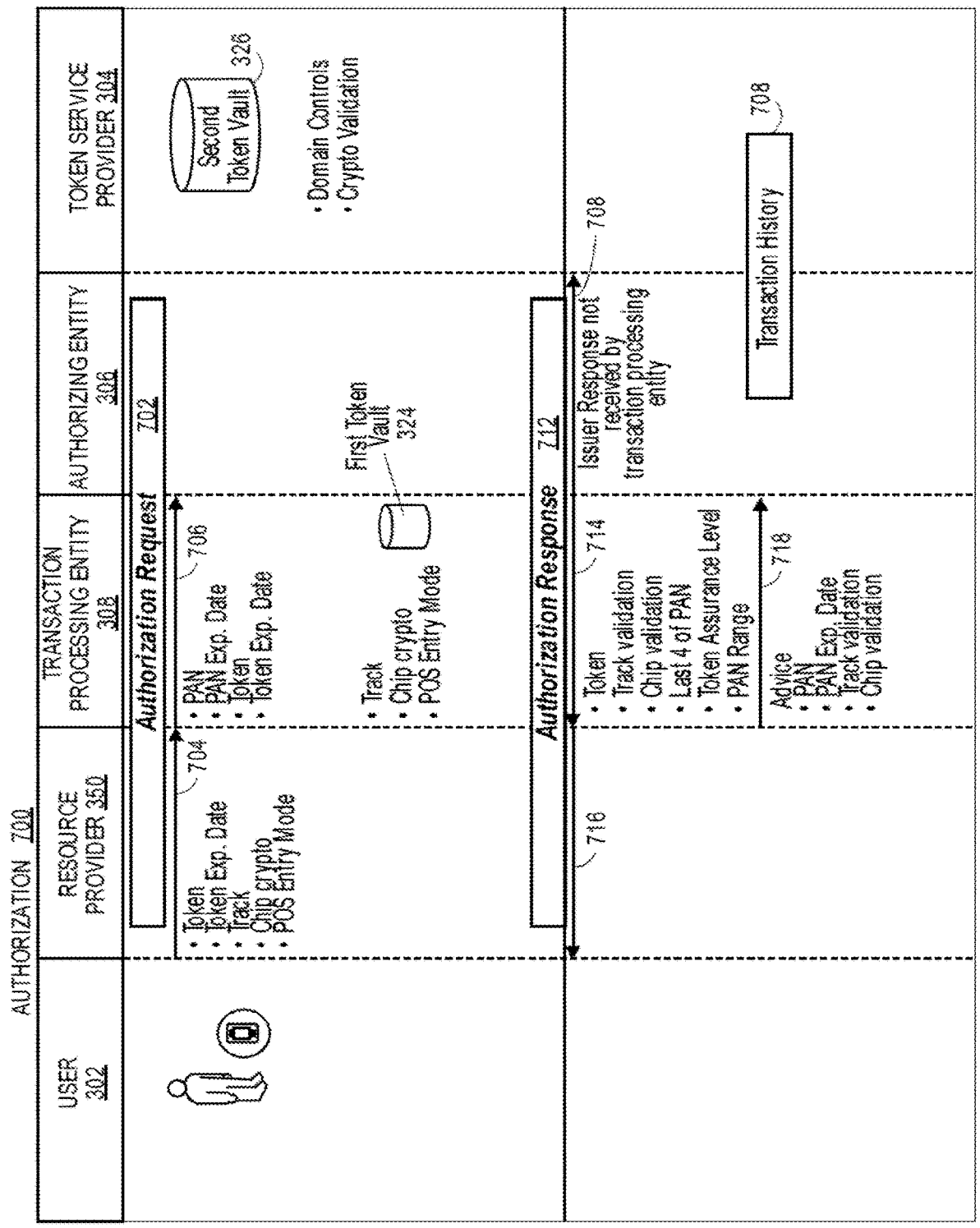
FIG. 7 shows a block diagram for a stand-in authorization processing in a tokenization environment according to various embodiments

FIG. 7 shows the stand-in authorization process 700 having two main components: the authorization request 702 and the authorization response 712. Similarly to the process in FIG. 6, the resource provider 350 generates an authorization request message 704 and sends the authorization request message 704 to the transaction processing entity 308. The authorization request message 704 may include the token, the token expiration date received from the user 302, as well as any additional data associated with the token (e.g. token presentment mode), the user device (e.g. device identifier, whether the user device has a cryptoprocessor and the data received from the user device is encrypted), the resource provider's device (e.g. device identifier) and/or the transaction. The transaction processing entity 308 may detokenize the token and generate a modified authorization request message 706 including at least the account identifier (e.g. PAN) and the token. The modified authorization request message 706 may also include the account identifier expiration date and the token expiration date. The transaction processing entity 308 may transmit the modified authorization request message 706 to the authorizing entity 306.

If a response from the authorizing entity 306 is not received by the transaction processing entity 308 by a predetermined time (or within a predetermined amount of time), the transaction processing entity 308 may start the stand-in authorization process and may send a token data request message 708 to the token service provider 304 to request additional token data associated with the token from the second token vault 326. For example, the second token vault 326 may store domain controls, encryption validation keys, etc. In some embodiments, the token service provider 304 may send transaction history 608 associated with the account identifier and/or the token to the a transaction processing entity 308. The transaction history 608 associated with the token may be stored at the second token vault 326. The transaction processing entity 308 may determine to authorize or decline the transaction based on the data retrieved from the first token vault 324 and the second token vault 326.

The transaction processing entity 308 may generate an authorization response message 714 and send the authorization response message 714 to the resource provider 350. The authorization response message 714 may include the token and an indication of whether the transaction is approved or declined. The authorization response message 714 may also include the chip validation indicator. The resource provider 350 may notify the user 302 about whether the transaction is approved or declined at step 716. The transaction processing entity 308 may also notify the authorizing entity 306 about the outcome of the authorization process. The transaction processing entity 308 may send an authorization advice message 718 to the authorizing entity 306. The authorization advice message 718 may include at least the account identifier and an indication of whether the transaction is approved or declined. The authorization advice message 718 may also include the chip validation indicator.

Even though embodiments discussed above in connection with FIGS. 3-7 illustrate the token service provider 304 as a separate entity, in some embodiments, the transaction processing entity 308 or the authorizing entity 306 may act as the token service provider 304, as illustrated in FIG. 1B.

There may be several technical benefits at storing tokens and token data at more than one token vault. For example, storing token data using at least two token vaults provides redundancy for security purposes. When the second token vault is a mirror vault (e.g. the second token vault stores the same data as the first token vault), the mirrored vault provides a secondary secure, back up for token data.

Another technical benefit provided by the embodiments is the ability to split the functions in token generation, processing and management between the entities that manage the token vaults. For example, the first entity managing the first token vault storing at least the token, the corresponding account identifier and a mapping between the token and the account identifier may receive and detokenize (e.g. replace the token with the corresponding account identifier) a transaction request including the token. On the other hand, the second entity managing the second token vault storing domain restrictions associated with the token may apply the domain restrictions. The separation of functionalities may provide increased fraud prevention as first entity and the second entity can perform respective data analysis based on manipulation of different data only available to each of these entities.

For example, the first entity may be a transaction processing entity. The transaction processing entity may have more information about a potential security breach at a resource provider (e.g. a merchant) and may identify a transaction request coming from the particular resource provider as fraudulent. Similarly, the transaction processing entity will have more information about user accounts issued by several issuers. For example, the transaction processing entity may identify that a first user account issued by a first entity is compromised. Accordingly, the transaction processing entity may choose to block transactions for a second user account of the same user which is issued by a second issuer. The first issuer may not be privy to this information as the second user account is not issued by the first issuer.

The second entity may be an authorizing entity (e.g. the issuer of the account that is represented by the token). The authorizing entity will have more information about the user. For example, the issuer may be notified by the user about the user data being compromised (e.g. user's wallet may be stolen). In that case, the issuer may determine that the user's accounts for different transaction processing entities (e.g. user's MasterCard account and VISA account) issued by the same issuer will be compromised. Alternatively, if the user's account for one transaction processing entity (e.g. user's MasterCard account) is blocked for some reason, the issuer may closely scrutinize a transaction associated with another account of that user (e.g. user's VISA) account. Accordingly, separating the functionalities associated with the tokens may be beneficial as different entities possess different information and perform different data analysis using the available information.

As explained above, storing token data at multiple token vaults may result in different entities performing different token generation, processing and management functions which provides for a flexible authorization process. For example, when the token vault managed by the authorizing entity stores domain restrictions associated with the token, the authorizing entity may determine to override a transaction that would have been declined based on domain restrictions and allow the transaction.

Embodiments further provide for a faster authorization process, Even when the transaction processing entity were to apply the domain restrictions, the authorizing entity remains as the final decision point that approves/declines a transaction. However, if the authorizing entity applies the domain restrictions, the result of the "applying the restrictions" is to approve/decline the transaction, thereby eliminating one step of the process.

The various participants and elements described herein with reference to FIGS. 1-7 may operate one or more computer apparatuses to facilitate the functions described herein. Any of the elements in FIGS. 1-7, including any servers or databases, may use any suitable number of subsystems to facilitate the functions described herein.

The one or more computer apparatuses and/or subsystems may be interconnected via a system bus. Additional subsystems may include a printer, keyboard, fixed disk (or other memory comprising computer readable media), monitor, which is coupled to display adapter, and others. Peripherals and input/output (I/O) devices, which couple to I/O controller (which can be a processor or other suitable controller), can be connected to the computer system by any number of means known in the art, such as serial port. For example, the serial port or an external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium.

Embodiments of the invention are not limited to the above-described embodiments. For example, although separate functional blocks are shown for an issuer, payment processing network, and acquirer, some entities perform all of these functions and may be included in embodiments of invention.

Specific details regarding some of the above-described aspects are provided above. The specific details of the specific aspects may be combined in any suitable manner without departing from the spirit and scope of embodiments of the invention. For example, back end processing, data analysis, data collection, and other transactions may all be combined in some embodiments of the invention. However, other embodiments of the invention may be directed to specific embodiments relating to each individual aspect, or specific combinations of these individual aspects.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    managing, by a server computer, a first token vault storing a first set of data associated with a token representing an account identifier associated with a user account, wherein the first token vault is synchronized with a second token vault storing a second set of data associated with the token, the second token vault is managed by a managing entity other than the server computer;
    updating, by the server computer, the first set of data in the first token vault;
    transmitting, by the server computer, updated first set of data to the managing entity, wherein the second token vault is synchronized with the first token vault based on the updated first set of data;
    receiving, by the server computer, an authorization request message associated with a transaction from a resource provider computer, the authorization request message including the token and at least a portion of the second set of data associated with the token including at least the account identifier; and
    processing, by the server computer, the authorization request message.

2. The method of claim 1, wherein the second token vault is continuously synchronized with the first token vault immediately after content of the first token vault is updated.

3. The method of claim 1, wherein an authorizing entity computer manages the second token vault.

4. The method of claim 1, wherein the processing further comprises:
    determining, by the server computer, to approve or decline the transaction based on data retrieved from the first token vault that is synchronized with the second token vault, wherein the server computer approves or declines the transaction in lieu of an authorizing entity computer.

5. The method of claim 1, wherein the processing further comprises:
    transmitting, by the server computer to an authorizing entity computer, the authorization request message;
    receiving, by the server computer from the authorizing entity computer, a response message authorizing or declining the transaction, wherein the authorizing entity computer retrieves additional data associated with the token from the second token vault for processing the authorization request message.

6. The method of claim 5, wherein the additional data is only stored at the second token vault.

7. The method of claim 5, wherein the additional data includes one or more of an encryption validation key, or a domain restriction associated with the token, wherein the domain restriction limits use of the token to a particular domain.

8. The method of claim 1, wherein the first set of data and the second set of data are mutually exclusive.

9. The method of claim 1, wherein the first set of data and the second set of data are non-mutually exclusive.

10. The method of claim 1, wherein the first set of data associated with the token stored in the first token vault includes one or more of a token status indicator, a device identifier associated with the token, a token expiration date, an account identifier expiration date, a token assurance level, a token type, and a token requestor identifier.

11. The method of claim 1, wherein the second token vault stores override data associated with the token.

12. The method of claim 1, further comprising:
    generating, by the server computer, the token and the first set of data associated with the token; and
    storing, by the server computer, the token, a mapping between the token and the account identifier, and the first set of data at the first token vault.

13. A server computer comprising:
    a processor; and
    a computer readable medium, the computer readable medium comprising code that, when executed by the processor, causes the processor to:
        manage a first token vault storing a first set of data associated with a token representing an account identifier associated with a user account, wherein the first token vault is synchronized with a second token vault storing a second set of data associated with the token, the second token vault is managed by a managing entity other than the server computer;
        update the first set of data in the first token vault;
        transmit updated first set of data to the managing entity, wherein the second token vault is synchronized with the first token vault based on the updated first set of data;
        receive an authorization request message associated with a transaction from a resource provider computer, the authorization request message including the token and at least a portion of the second set of data associated with the token including at least the account identifier; and
        process the authorization request message.

14. The server computer of claim 13, wherein the first set of data and the second set of data are non-mutually exclusive.

15. The server computer of claim 13, wherein the second token vault is continuously synchronized with the first token vault immediately after content of the first token vault is updated.

16. The server computer of claim 13, wherein the processing further comprises:
    determine to approve or decline the transaction based on data retrieved from the first token vault that is synchronized with the second token vault, wherein the server computer approves or declines the transaction in lieu of an authorizing entity computer; or
    transmit, to the authorizing entity computer, the authorization request message; and
    receive, from the authorizing entity computer, a response message authorizing or declining the transaction, wherein the authorizing entity computer retrieves additional data associated with the token from the second token vault for processing the authorization request message.

17. The server computer of claim 16, wherein the additional data is only stored at the second token vault, and wherein the additional data includes one or more of override data, an encryption validation key, or a domain restriction associated with the token, wherein the domain restriction limits use of the token to a particular domain.

18. The server computer of claim 13, wherein the code, when executed by the processor, further causes the processor to:
- generate the token and the first set of data associated with the token; and
- store the token, a mapping between the token and the account identifier, and the first set of data at the first token vault.

* * * * *